D. W. GROSSMAN.
COVER FOR HOG TROUGHS.
APPLICATION FILED APR. 1, 1916.
1,187,307.
Patented June 13, 1916.
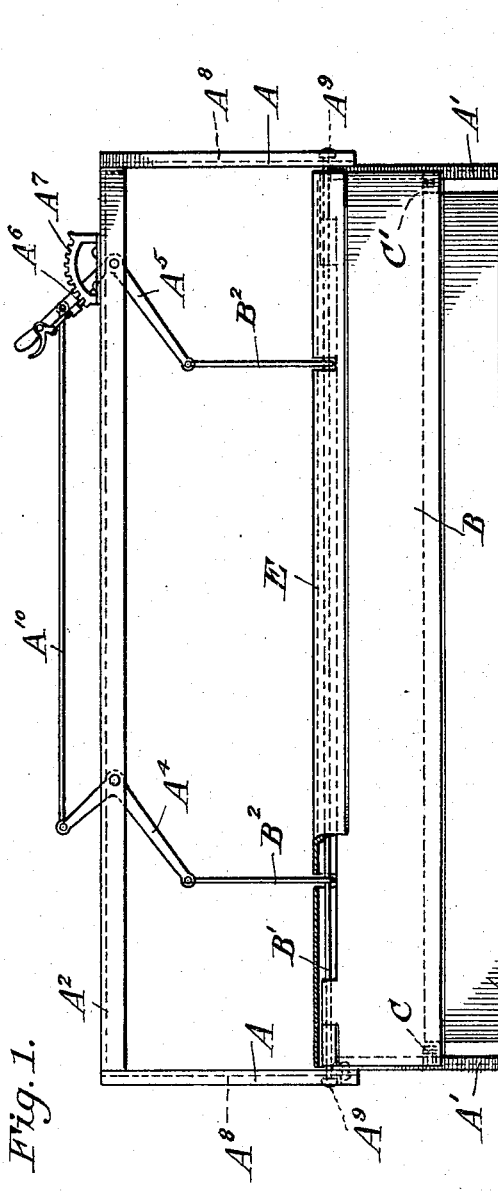
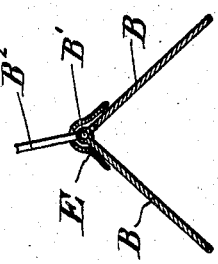
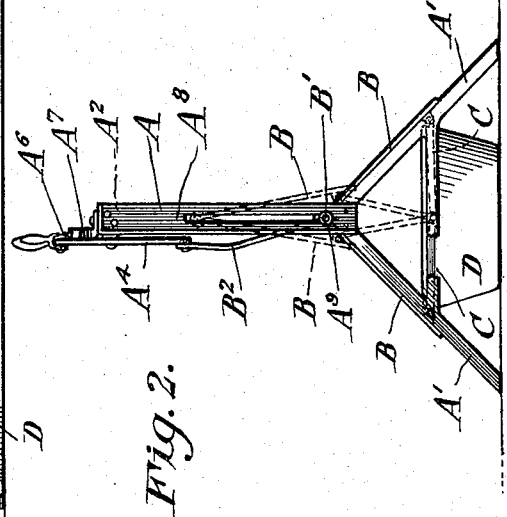
Witnesses
Inventor
David W. Grossman
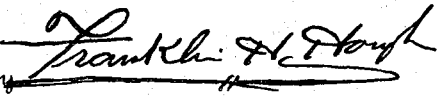
Attorney

UNITED STATES PATENT OFFICE.

DAVID W. GROSSMAN, OF CULVER, INDIANA.

COVER FOR HOG-TROUGHS.

1,187,307. Specification of Letters Patent. Patented June 13, 1916.

Application filed April 1, 1916. Serial No. 88,386.

*To all whom it may concern:*

Be it known that I, DAVID W. GROSSMAN, a citizen of the United States, residing at Culver, in the county of Marshall and State of Indiana, have invented certain new and useful Improvements in Covers for Hog-Troughs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in protectors for feeding troughs and it has for its object to provide a protector or shield which will keep hogs or other animals out of a feeding trough while the same is being filled with food.

A further object of the invention resides in the provision of a trough protector which will prevent the trough from becoming filled with rain, snow or ice and also prevent hogs from crossing over the trough or upsetting the same.

The invention comprises various details of construction, combinations and arrangements of parts which will be hereinafter fully described, shown in the accompanying drawings and then specifically defined in the appended claims.

My invention is illustrated in the accompanying drawings, in which:

Figure 1 is a side elevation of my invention. Fig. 2 is an end view thereof, and Fig. 3 is a detail section through the protecting panels.

Reference now being had to the details of the drawings by letter, A, A designate vertical standards having triangular shaped bases or supporting frames $A^7$, $A'$ secured to their lower ends, and their upper ends are connected by a bar $A^2$ upon which are mounted levers $A^4$ and $A^5$ secured near its opposite end and connected together by a rod $A^{10}$. A lever $A^5$ is provided with a handle and pawl $A^6$ which is adapted to engage a segment rack $A^7$ secured on the fixed rod $A^2$ to hold the said levers in different adjusted positions. Cover boards or panels B, B, which may normally rest upon the trough, are hingedly connected together by a rod $B'$, the ends of which extend through guide slots $A^8$, $A^8$, in the standards A and are provided with suitable heads $A^9$, $A^9$.

Links $B^2$, $B^2$ connect the lower ends of the levers $A^4$ and $A^5$ to the panels B, B and cause the said panels to raise or lower when the levers are adjusted from one position to another. Suitable links C and C' have their lower ends connected to the standards and their outer ends are pivotally connected to the lower ends of the panels B, B, said links serving to bring the panels B, B together when in raised position to prevent hogs from getting in or crossing over the feed trough D which is located beneath the panels, and between the standards A.

An inverted V-shaped crowning strip E is secured above the hinge portion of the panels to protect the said hinge against rain and ice. When the protector is in use, it is placed over the feeding trough with one end abutting a fence, the panels being in lowered position will keep the hogs or other animals away from the trough while the feed is being placed in the trough from the end thereof and, when the panels are raised, will permit the animals to feed.

What I claim to be new is:—

1. A trough protector comprising standards, panels located between the standards, a rod hingedly connecting the panels together and guided in the standards, links pivotally connected with the standards and with the panels, and means supported upon the standards and connected with the hinged rod for raising and lowering the panels.

2. A trough protector comprising standards having longitudinally disposed slots, panels located between the standards, a rod hingedly connecting the panels together and having end portions lying in the slots, links pivotally connected with the standards and with the panels, and means supported upon the standards and connected with the rod for raising and lowering the panels.

In testimony whereof I hereunto affix my signature in presence of two witnesses.

DAVID W. GROSSMAN.

Witnesses:
 GUY BAKER,
 JOSEPH C. WHITESELL.